Patented July 23, 1935

2,008,738

UNITED STATES PATENT OFFICE 2,008,738

ISODIBENZANTHRONE-AZOLE AND PROCESS OF PREPARING THE SAME

Alexander J. Wuertz, Carrollville, and Myron S. Whelen, Milwaukee, Wis., assignors to E. I. du Pont de Nemours & Company, Wilmington, Del., a corporation of Delaware No Drawing. Application April 29, 1933,
Serial No. 668,623

16 Claims. (Cl. 260—44)

This invention relates to azole compounds of the isodibenzanthrone series. It is an object of this invention to prepare novel compounds of the isodibenzanthrone series which are useful as vat dyestuffs. Other and further important objects of this invention will appear as the description proceeds.

The compounds with which this invention deals are characterized by possessing in their structure an isodibenzanthrone nucleus which is substituted by both nitrogen and an element of the sulfur series, for instance, sulfur or selenium. The inorganic elements are very probably present in the form of an azole ring, such as thiazole or selenazole. With due allowance for partial decomposition of the azole ring during the fusion process by which our novel compounds are formed, they probably constitute mixtures of isodibenzanthrone-diazoles and isodibenzanthrone-monozoles.

The products of this invention are navy blue to dark blue vat dyestuffs, depending on the particular substituent in the carbon atom of the azole ring, as well as on the presence or absence of substituents, such as halogen, in the isodibenzanthrone nucleus. They are prepared by caustic fusion of the Bz1-halogen-benzanthrone-thiazoles and -selenazoles described and claimed in our copending applications of even date, Ser. Nos. 668,620 and 668,621.

The Bz1-halogen-benzanthrones-thiazoles are prepared by reacting 2,2'-diamino-1,1'-dianthraquinonyl-disulfide with an aldehyde in known manner to produce the corresponding anthraquinone 1,2-thiazole which is then reduced in concentrated sulfuric acid and reacted simultaneously or subsequently with glycerine to form the benzanthrone compound. The benzanthrone-thiazoles so produced may have a structure corresponding to one of the following formulæ:

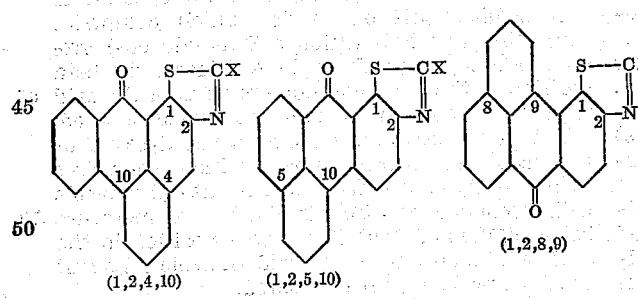

(1,2,4,10)   (1,2,5,10)   (1,2,8,9)

This benzanthrone-thiazole may then be halogenated by suspending it in water and treating with a brominating or chlorinating agent. The Bz1-halogen-benzanthrone-selenazole may be formed in the same manner by starting with a corresponding selenium compound.

The caustic fusion may be carried out along analogous lines with the known procedures for fusing Bz1-halogen-benzanthrones to isodibenzanthrones. See, for instance, U. S. Patent No. 906,367. The preferred method involves the use of alcohol as a diluent and employs a temperature between 100 and 170° C. It is advantageous, however, to adhere to the lower temperatures, say 120 to 140° C., in order to minimize decomposition of the azole ring.

Isodibenzanthrones substituted in the nucleus may be obtained by fusing correspondingly substituted Bz1-halogen-benzanthrone-azoles, or the unsubstituted isodibenzanthrone-azoles may be formed first and then subjected to an operation for introducing substituents, as will be readily understood by those skilled in the art.

Without limiting our invention to any particular procedure, the following examples are given to illustrate our specific mode of operation. The parts mentioned are by weight.

*Example 1.—Fusion of Bz1-brom-benzanthrone-1,2-phenyl-thiazole*

3.3 parts of sodium are dissolved in 20 parts of alcohol, and thereto are added 20 parts of flaked potassium hydroxide. The melt is heated to 125° C. and maintained at this temperature until completely fluid. 10 parts of Bz1-brom-benzanthrone-1,2-phenyl-thiazole (Example 6 of copending application, Ser. No. 668,620) are then added and the reaction mass is heated at about 135° C. for one hour. The fusion mass is then diluted with about 1000 parts of warm water, thoroughly mixed, and the precipitated dyestuff is filtered off as an insoluble leuco body. It is washed free of impurities with a dilute solution of sodium hydroxide and sodium hydrosulfite in water, acidified, washed acid free with water and dried. The isodibenzanthrone-thiazole body so formed is a violet-black powder, which on dissolving in sulfuric acid gives a green coloration. It dyes cotton from a blue vat with red-brown fluorescence, in navy blue shades. Its fastness to water is superior to that of isodibenzanthrone.

*Example 2.—Fusion of Bz1-chlor-benzanthrone-1,2-phenyl-thiazole*

7 parts of sodium are dissolved in 50 parts of alcohol, and thereto are added 50 parts of potassium hydroxide. The melt is heated to 125° C. and maintained at this temperature until completely fluid. 10 parts of Bz1-chlor-benzanthrone-1,2-phenyl-thiazole (Example 7 of copending application, Ser. No. 668,620) are then added and the reaction mass is heated at about 135° C. for one hour. The isodibenzanthrone-thiazole body so formed is isolated as in Example 1, and appears to be identical with the product therein obtained.

*Example 3.—Chlorination of thiazole substituted isodibenzanthrone*

10 parts of phenyl-thiazole-isoviolanthrone (as obtained according to Example 1 above) are suspended in 150 parts of ortho-dichloro-benzene, and chlorine gas is slowly passed into the mixture until the evolution of hydrochloric acid has almost stopped or until a chlorine content of about two atoms of chlorine has been reached. The halogenated dyestuff is then filtered off, and washed successively with ortho-dichloro-benzene and alcohol. It is a navy blue powder, which dyes cotton from a blue vat in grey to navy blue shades. Dyeings so made are of superior fastness to water than dichloro-isodibenzanthrone.

*Example 4.—Bromination of phenyl-thiazole-isodibenzanthrone*

10 parts of phenyl-thiazole-isoviolanthrone (prepared according to Example 1 above) are dissolved in 100 parts of chlor-sulfonic acid. A trace of iodine is added, and then 5 parts of bromine are introduced over a short period of time. The whole is then stirred until evolution of hydrobromic acid has practically ceased. The dyestuff is isolated by pouring the chlor-sulfonic acid solutions onto ice, followed by filtration and washing. The product so obtained dyes cotton in greenish navy blue shades reasonably fast to water spotting. It corresponds in bromine content to a dibromo compound.

*Example 5.—Chlorination of phenyl-thiazole-isodibenzanthrone*

10 parts of phenyl-thiazole-isoviolanthrone are dissolved in 100 parts of chlor-sulfonic acid. A trace of iodine is added, and chlorine is then passed in slowly until the evolution of hydrochloric acid has practically ceased. The chlorinated body thus formed is isolated in a manner analogous to that shown in Examples 3 and 4. It dyes cotton from a greenish-blue vat in greenish navy blue shades, which are reasonably fast against water spotting. Its chlorine content corresponds to a dichloro compound.

If the Bz1-halogen-benzanthrone-phenyl-thiazoles used in Examples 1 and 2 are replaced respectively by equal weights of the corresponding Bz1-halogen-benzanthrone-phenyl-selenazoles (obtainable according to Examples 6 and 7 of copending application Ser. No. 668,621), a product of very similar properties is obtained, except of course that it is an isodibenzanthrone-selenazole body instead of a thiazole body. When this product is now subjected to halogenation according to any of the Examples 3, 4 and 5, a product is obtained which is again substantially identical in properties with the product of the respective example, except of course that it contains selenium instead of sulfur.

It will be understood that many variations and modifications are possible in our preferred mode of operation without departing from the spirit of this invention.

In the claims below it should be understood that where new products, dyestuffs, or articles of manufacture are claimed, we mean to include these bodies not only in substance, but also in whatever state they exist when applied to materials dyed, printed, or pigmented therewith.

We claim:

1. A vat dyestuff of the isodibenzanthrone azole series, said dyestuff dyeing cotton in navy blue to dark blue shades of superior water fastness to those of isodibenzanthrone; and said dyestuff being obtainable by subjecting to alkali fusion a compound from the class consisting of a Bz1-halogen-benzanthrone-1,2-thiazole and a Bz1-halogen-benzanthrone-1,2-selenazole the beta position in the anthraquinone nucleus of the azole compound adjacent the Bz-ring being unsubstituted.

2. A sulfur containing vat dyestuff of the isodibenzanthrone series, yielding upon cotton navy blue to dark blue dyeings of superior water-fastness than those of isodibenzanthrone, said dyestuff being obtainable by subjecting to alkali fusion a Bz1-halogen-benzanthrone-1,2-thiazole the beta position in the anthraquinone nucleus of the thiazole compound adjacent the Bz-ring being unsubstituted.

3. A vat dyestuff comprising chiefly an isodibenzanthrone-alpha, beta; alpha', beta' dithiazole.

4. A vat dyestuff comprised chiefly of isodibenzanthrone-C-C'-diphenyl-alpha, beta; alpha', beta' dithiazole.

5. The process of producing a vat dyestuff of the isodibenzanthrone series, which comprises subjecting to alkali fusion a Bz1-halogen-benzanthrone-azole of the series consisting of Bz1-halogen-benzanthrone-alpha, beta thiazoles and Bz1-halogen-benzanthrone-alpha, beta selenazoles the beta position in the anthraquinone nucleus of said azole compounds adjacent the Bz-ring being unsubstituted.

6. The process of producing a vat dyestuff of the isodibenzanthrone series which comprises subjecting to alkali fusion a Bz1-halogen-benzanthrone-alpha, beta thiazole the beta position in the anthraquinone nucleus of the said thiazole adjacent the Bz-ring being unsubstituted.

7. The process of producing a vat dyestuff of the isodibenzanthrone series which comprises subjecting to alkali fusion a Bz1-halogen-benzanthrone-c-phenyl-alpha, beta thiazole the beta position in the anthraquinone nucleus of the said thiazole adjacent the Bz-ring being unsubstituted.

8. The process of producing a vat dyestuff of the isodibenzanthrone series which comprises fusing a Bz1-halogen-benzanthrone-1,2-thiazole with alcoholic caustic alkali at a temperature between 120 and 140° C. the beta position in the anthraquinone nucleus of said thiazole adjacent the Bz-ring being unsubstituted.

9. The process of producing a vat dyestuff of the isodibenzanthrone series which comprises fusing Bz1-halogen-benzanthrone-1,2-C-phenyl-thiazole with alcoholic caustic alkali at a temperature between 120 and 140° C.

10. The process of producing a vat dyestuff of the isodibenzanthrone series which comprises fusing Bz1-halogen-benzanthrone-1,2-C-phenyl-thiazole with alcoholic caustic alkali at a temperature between 120 and 140° C., and subjecting the product to halogenation.

11. The process of producing a vat dyestuff of the isodibenzanthrone series which comprises chlorinating an isodibenzanthrone-C-phenyl-alpha, beta thiazole in an inert organic suspending medium.

12. The process of producing a vat dyestuff of the isodibenzanthrone series which comprises chlorinating an isodibenzanthrone-C-phenyl-alpha, beta thiazole in chlorosulfonic acid.

13. The process of producing a vat dyestuff of the isodibenzanthrone series which comprises brominating an isodibenzanthrone-C-phenyl-alpha, beta thiazole in chlorosulfonic acid.

14. Halogenated isodibenzanthrone-C-phenyl-alpha, beta-thiazoles.

15. Dichlorinated isodibenzanthrone-C-phenyl-alpha, beta-thiazoles.

16. Dibrominated isodibenzanthrone-C-phenyl-alpha, beta-thiazoles.

ALEXANDER J. WUERTZ.
MYRON S. WHELEN.